United States Patent
Fukuyama

(10) Patent No.: US 10,427,360 B2
(45) Date of Patent: Oct. 1, 2019

(54) TOOL FOR FIXING A TEXTILE SLEEVE ABOUT AN ELONGATE MEMBER TO BE PROTECTED AND METHOD OF FIXING A PROTECTIVE TEXTILE SLEEVE ABOUT AN ELONGATE MEMBER

(71) Applicant: Federal-Mogul Powertrain, LLC, Southfield, MI (US)

(72) Inventor: Shozo Fukuyama, Tokyo (JP)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 15/457,729

(22) Filed: Mar. 13, 2017

(65) Prior Publication Data

US 2017/0259496 A1 Sep. 14, 2017

Related U.S. Application Data

(60) Provisional application No. 62/337,430, filed on May 17, 2016, provisional application No. 62/307,805, filed on Mar. 14, 2016.

(51) Int. Cl.
*B29C 65/00* (2006.01)
*B29C 65/30* (2006.01)
(Continued)

(52) U.S. Cl.
CPC .......... *B29C 66/8141* (2013.01); *B29C 65/30* (2013.01); *B29C 66/1122* (2013.01);
(Continued)

(58) Field of Classification Search
CPC ........ B29C 66/81453; B29C 66/81463; B29C 66/1122; B29C 66/8286; B29C 66/8414; H02G 15/18
See application file for complete search history.

(56) References Cited

U.S. PATENT DOCUMENTS 1,644,911 A 10/1927 Braun
1,704,413 A 3/1929 Wait
(Continued)

FOREIGN PATENT DOCUMENTS

EP 1154193 A1 11/2001

OTHER PUBLICATIONS

International Search Report, dated Jun. 2, 2017 (PCT/US2017/022217).

*Primary Examiner* — Christopher T Schatz
(74) *Attorney, Agent, or Firm* — Robert L. Stearns; Dickinson Wright, PLLC

(57) ABSTRACT

A tool for fixing a protective textile sleeve about an elongate member contained therein, and method of use thereof is provided. The tool includes a clamp assembly having opposed clamp members. Each of the clamp members has a clamp surface for abutting the textile sleeve. Each of the clamp surfaces includes a plurality of heating members operably connected to a source of power. The heating members within each clamping surface are supported for independent radial movement relative to one another in response to engagement with an outer surface of the textile sleeve to allow the clamp surfaces to automatically conform to the arcuate shape of the sleeve and elongate member being clamped therebetween.

16 Claims, 16 Drawing Sheets

(51) Int. Cl.
  *H02G 1/14* (2006.01)
  *H02G 15/18* (2006.01)
  *B29L 31/34* (2006.01)

(52) U.S. Cl.
  CPC .......... *B29C 66/431* (2013.01); *B29C 66/729* (2013.01); *B29C 66/81453* (2013.01); *B29C 66/81463* (2013.01); *B29C 66/8286* (2013.01); *B29C 66/8414* (2013.01); *B29C 66/861* (2013.01); *H02G 1/14* (2013.01); *H02G 15/18* (2013.01); *B29L 2031/3462* (2013.01)

(56) References Cited

U.S. PATENT DOCUMENTS

| | | |
|---|---|---|
| 3,062,944 A | 11/1962 | Grandel |
| 3,590,206 A | 6/1971 | Lago |
| 3,654,429 A | 4/1972 | Strachan |
| 3,867,226 A | 2/1975 | Guido et al. |
| 4,205,221 A | 5/1980 | Meyer |
| 5,166,007 A | 11/1992 | Smith et al. |
| 5,412,184 A | 5/1995 | McGaffigan |
| 6,502,811 B1 | 1/2003 | Haruta |
| 6,776,604 B1* | 8/2004 | Chobotov ............... B29C 53/44 425/392 |
| 2013/0299035 A1 | 11/2013 | Laurent et al. |

* cited by examiner

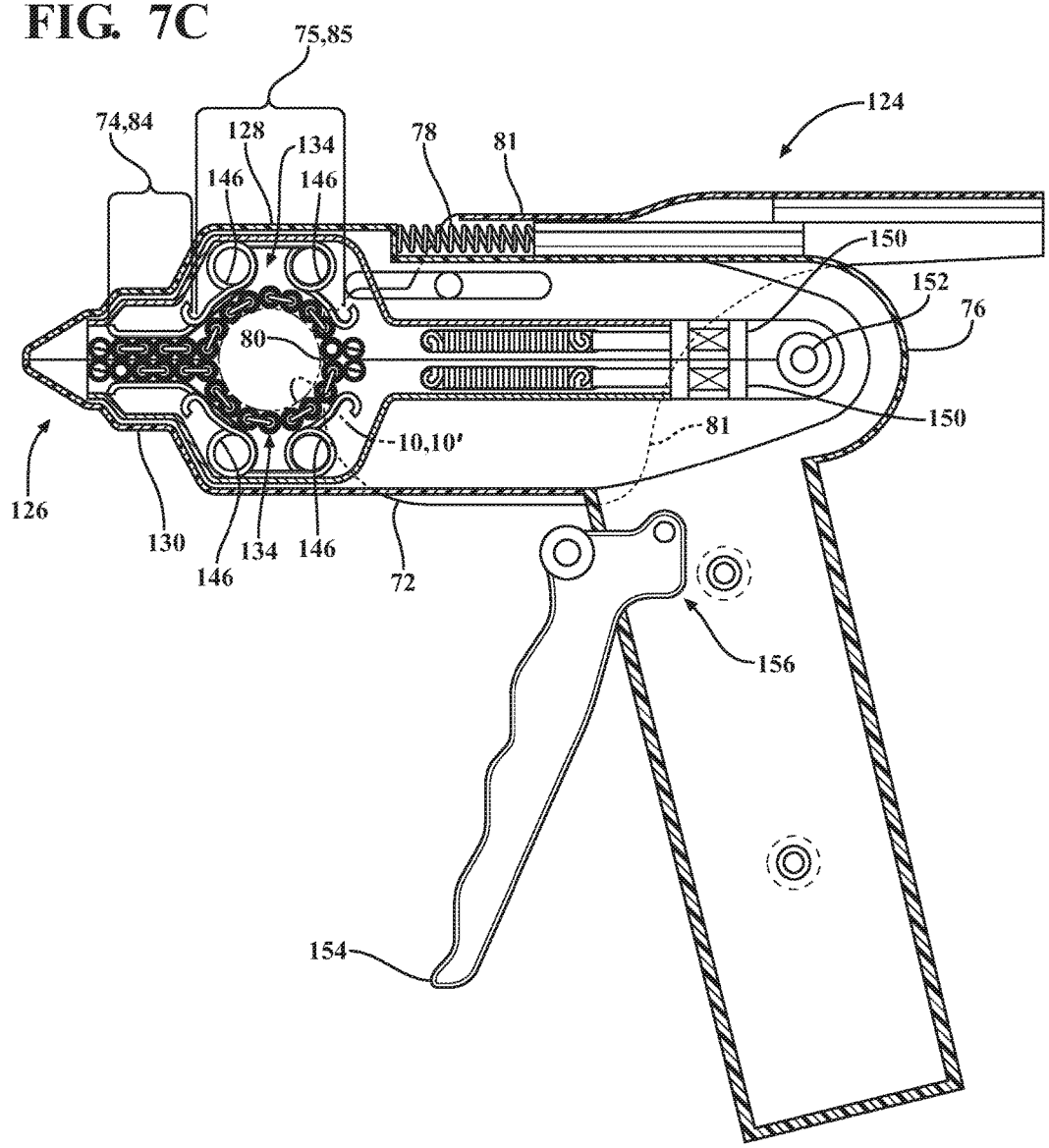

TOOL FOR FIXING A TEXTILE SLEEVE ABOUT AN ELONGATE MEMBER TO BE PROTECTED AND METHOD OF FIXING A PROTECTIVE TEXTILE SLEEVE ABOUT AN ELONGATE MEMBER

CROSS-REFERENCE TO RELATED APPLICATIONS

This application claims the benefit of U.S. Provisional Application Ser. No. 62/337,430, filed May 17, 2016, and also U.S. Provisional Application Ser. No. 62/307,805, filed Mar. 14, 2016, which are both incorporated herein by way of reference in their entirety.

BACKGROUND OF THE INVENTION

1. Technical Field

This invention relates generally to protective textile sleeves for providing protection to elongate members contained therein, and more particularly to a tool for fixing a protective textile sleeve to itself and/or to an elongate member extending therethrough.

2. Related Art

Protective textile sleeves for providing protection to elongate members extending therethrough are known. Typically, the protective sleeves are formed having one of a tubular wall having a circumferentially continuous wall, or a wrappable wall having opposite lengthwise extending edges configured to be wrapped into overlapping relation with one another. Depending on the type of aforementioned wall and end use, a portion of the sleeve can be fixed to itself or the elongate member extending therethrough via separately applied wrapped tape or glue applied during installation. The use of tape to secure the sleeve in place has various drawbacks, as it is costly from a material and labor standpoint, and it can also prove unsightly if not applied correctly. Further, the externally applied tape must be readily available during installation of the sleeve, otherwise the assembly process can be delayed, and further yet, the tape can become inadvertently damaged or ineffectively applied during assembly, such as by being inadvertently folded on itself or contaminated via dirty surroundings or hands during application, thus, adversely affecting the ability of the tape to reliably fix the sleeve as intended. The application of separately applied glue during assembly is also costly from a material and labor standpoint, and further requires being readily available during assembly of the sleeve, and can further add cost as a result of the need to provide drying time for the glue. In addition, glue lacks strength at elevated temperatures, and can prove messy in application, thereby leading to further cost associated with damage, repair and the necessary clean-up thereof. In addition to the aforementioned drawbacks, both known mechanisms discussed above can be time consuming in process, which ultimately adds cost to the process.

SUMMARY OF THE INVENTION

In accordance with one aspect of the invention, a tool for fixing a protective textile sleeve about an elongate member contained therein is provided. The tool includes a clamp assembly having opposed clamp members. Each of the clamp members has a clamp surface for abutting the textile sleeve. Each of the clamp surfaces includes a plurality of heating members operably connected to a source of power. The heating members within each clamping surface are supported for independent radial movement relative to one another in response to engagement with an outer surface of the textile sleeve to allow the clamp surfaces to automatically conform to the arcuate shape of the sleeve and elongate member being clamped therebetween.

In accordance with another aspect of the invention, the plurality of heating members can be arranged in adjacent rows, with the rows extending lengthwise across a width of the clamp members. As such, with the sleeve and elongate member extending lengthwise across the width of the clamp members, the adjacent rows can readily conform to the outer peripheral shape and contour of the sleeve and elongate member.

In accordance with another aspect of the invention, the tool can further include a tension member operably connected to the heating members, wherein the tension member is selectively adjustable to change the relative ease with which the heating members move relative to one another. As such, depending on the physical properties of the sleeve and elongate member being compressed, the clamp surfaces can be selectively adjusted to increase or decrease the relative ease with which the clamp surfaces move under a clamping force.

In accordance with another aspect of the invention, the tension member can be provided as an adjustable spring member.

In accordance with another aspect of the invention, the tension member can be provided as an adjustable torsion spring.

In accordance with another aspect of the invention, the heating members forming each clamping surface can be configured to form a substantially planar clamping surface when in an unbiased, non-clamping state, wherein the heating members are configured to move relative to one another to substantially conform to the outer shape of the textile sleeve upon being clamped about the textile sleeve.

In accordance with another aspect of the invention, the clamp members can be configured having a plurality of sections spaced from one another along the length of the clamping surfaces, wherein the plurality of sections are configured to accommodate different textile sleeves having different diameters from one another.

In accordance with another aspect of the invention, the clamp members can have a nose portion adjacent a free end of the clamp members and a main portion adjacent the nose portion, wherein the nose portion is configured to accommodate a sleeve having a first diameter and the main portion is configured to accommodate a sleeve having a second diameter, wherein the second diameter is larger than the first diameter.

In accordance with another aspect of the invention, the tool can be configured to include a protective cover shielding the heating members during a non-clamping state and being moveable away from the heating members during a clamping state.

In accordance with another aspect of the invention, the protective cover can be spring biased to remain in a protective position substantially shielding the heating members in the non-clamping state and slidable along the length of the clamp members in response to disposing a textile sleeve between the clamp members.

In accordance with another aspect of the invention, the tool has a handle operably attached to the opposed clamp members.

In accordance with another aspect of the invention, the tool can be configured to be hand held.

In accordance with another aspect of the invention, the tool can be automated.

In accordance with another aspect of the invention, the clamp members can be spring biased toward one of the open and closed states.

In accordance with another aspect of the invention, a method of fixing a protective textile sleeve about an elongate member is provided. The method includes providing the protective textile sleeve having an inner surface configured to bound an inner cavity; disposing the elongate member within the inner cavity; clamping at least a portion of the protective textile sleeve about the elongate member with opposed clamp members having clamp surfaces formed by a plurality of heating members, wherein the heating members in the opposite clamp members automatically adjust radially outwardly from one another and substantially conform to an arcuate shape and contour of an outer surface of the sleeve; and activating an adhesive via heat from the clamp members and bonding the inner surface to at least another portion of the textile sleeve and/or to the elongate member.

In accordance with another aspect of the invention, the method can further include arranging the heating members in each clamping surface to form substantially planar clamping surfaces when in an unbiased, non-clamping state, wherein at least some of the heating members in one clamping surface are configured to move radially away from at least some of the heating members in the opposite clamp member, wherein the radial movement is with respect to a longitudinal central axis of the textile sleeve, to substantially conform the heating members to the outer arcuate shape of the textile sleeve upon being clamped into abutment with the outer surface of the textile sleeve.

In accordance with another aspect of the invention, the method can further include configuring the clamp members having a plurality of different sections spaced from one another along the length of the clamping surfaces, wherein the plurality of different sections are configured to accommodate textile sleeves having different diameters from one another.

In accordance with another aspect of the invention, the method can further include configuring a nose portion of the clamp members adjacent a free end of the clamp members to accommodate a sleeve having a first diameter and configuring a main portion of the clamp members adjacent the nose portion to accommodate a sleeve having a second diameter that is larger than the first diameter.

In accordance with another aspect of the invention, the method can further include providing the tool with a protective cover shielding the heating members during a non-clamping state, with the cover being moveable out of shielding relation from at least some of the heating members during a clamping state.

In accordance with another aspect of the invention, the method can further include biasing the protective cover to remain in a protective position substantially shielding the heating members in the non-clamping state configuring the protective cover for sliding movement along the length of the clamp members in response to disposing a textile sleeve between the clamp members.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 7C is a view similar to FIG. 7B with the clamping tool shown in a closed, first loaded state;

DETAILED DESCRIPTION OF PRESENTLY PREFERRED EMBODIMENTS

Figure 1:
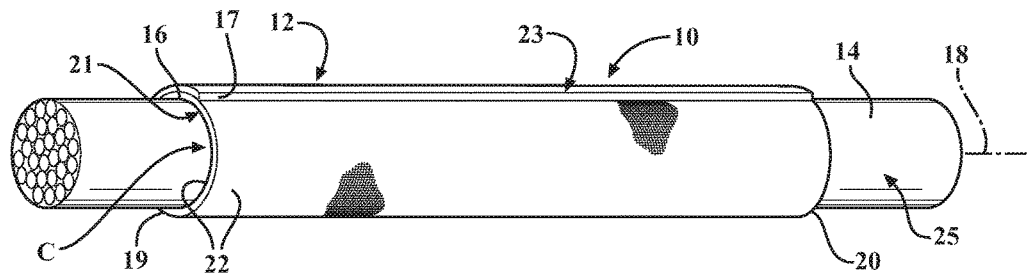
FIG. 1 is a perspective view of a wrappable protective sleeve shown fixed about an elongate member by a clamping tool constructed in accordance with one aspect of the invention.
Figure 1A:
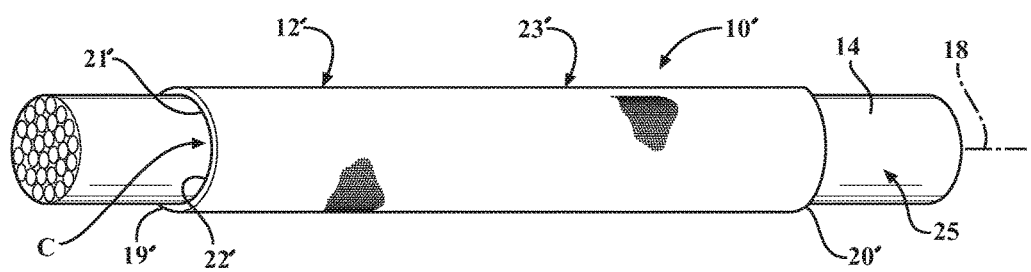
FIG. 1A is a perspective view of a circumferentially continuous, seamless protective sleeve shown fixed about an elongate member by a clamping tool constructed in accordance with another aspect of the invention.
Figure 3:
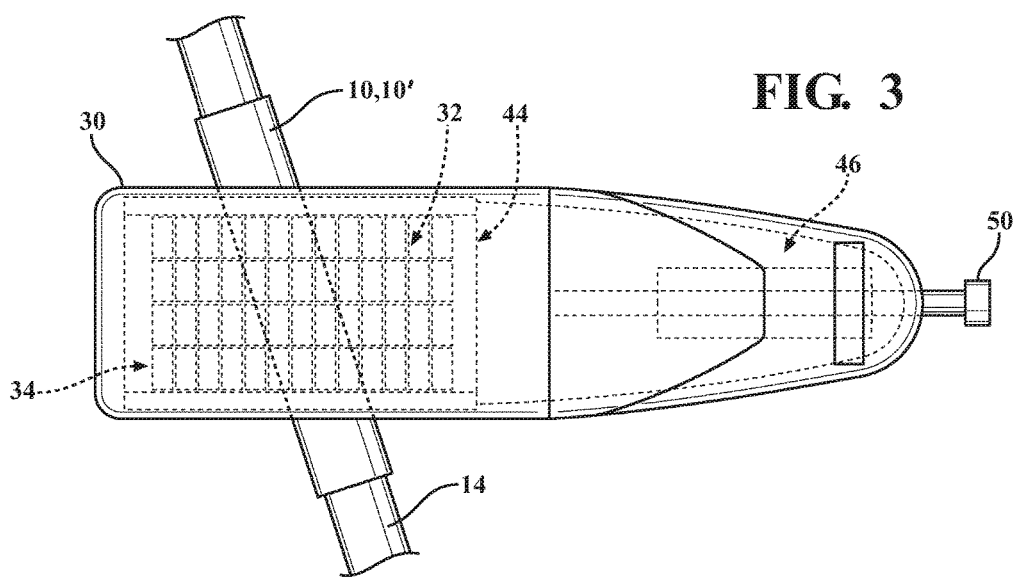
FIG. 3 is a partial plan view of the clamping tool of FIG. 2A showing a single clamp member of the clamping tool and illustrating an ability of a clamping surface of the clamp member to automatically adjust to a sleeve containing an elongate member while in an oblique relation to a lateral axis extending across a width of the clamping surface.

Referring in more detail to the drawings, FIGS. 1 and 1A illustrate textile sleeves constructed in accordance with one aspect of the invention, shown as a wrappable sleeve 10 in FIG. 1 and as a circumferentially continuous, seamless sleeve 10' in FIG. 1A, and referred to hereafter commonly as sleeve, unless noted otherwise. The reference numerals used to identify the features of the sleeves 10, 10' are the same, with the exception that the reference numerals of the sleeve 10' are primed (') to distinguish between the different embodiments. The sleeve 10 has a wrappable wall 12, such as a wrappable or self-wrapping elongate wall that automatically curls into its wrapped configuration absent some externally applied force, while the sleeve 10' has a circumferentially continuous, seamless wall 12', both for routing and protecting elongate members 14, such as a cable, wire harness, or tube, by way of example and without limitation. The elongate wall 12 has opposite inner and outer free edges 16, 17 extending generally parallel to a central, longitudinal axis 18 between opposite open ends 19, 20, wherein the edges 16, 17 can be manually wrapped or self-biased into overlapping relation with one another in "cigarette wrapped" fashion to fully enclose the elongate member(s) 14 within a central cavity C of the sleeve 10. The walls 12, 12' have an innermost face or surface, also referred to as inner surface 21, 21' and an outermost face or surface, also referred to as outer surface 23, 23', wherein the cavity C is bounded by the innermost surface 21, 21', and for the wrappable sleeve 10, the cavity C is readily accessible along the full length of the longitudinal axis 18 so that the elongate member(s) 14 can be readily disposed radially into the cavity C, and conversely, removed from the cavity C, such as during service. To adhere and fix the wall 12 to itself to maintain the wall 12 in its closed, wrapped configuration and/or to the elongate member 14 to prevent relative movement between the wall 12, 12' and the elongate member 14, and further, to facilitate preventing end fray of the opposite ends 19, 19', 20, 20' such as during cold cutting in manufacture and also during in use, the wall 12, 12' has an adhesive coating layer, referred to hereafter as adhesive coating 22, 22', bonded to at least a portion of at least one of the innermost surface 21, 21' and/or the outermost surface 23, 23'. The adhesive coating 22, 22' can be provided as a heat activatable and/or water activatable coating having a first, dried non-adhesive state upon first being applied to the wall 12, 12' and second, activated adhesive state, wherein the second state is activated at a chosen time and location via a clamping tool 24 (FIGS. 2 and 3A-3C) constructed in accordance with the invention.

Depending on the application needs, the wall 12, 12' can be constructed having any suitable size, including length and diameter, wherein the inventive tool 24 automatically adjusts to uniformly accommodate the dimensions and configuration of the sleeve 10, 10'. Further, the wall 12, 12' can be formed of interlaced yarn using any desired interlacing process, such as braiding, weaving or knitting. If the wall 12 is formed as a self-wrapping wall, at least some of the weft-wise, circumferentially extending yarn, whether multifilament and/or monofilament, can be provided as any suitable heat-settable polymeric material, such as polyphenylene sulfide (PPS) or polyethyleneterephthalate (PET), for example.

To apply the mixture of the coating 22 to the wall 12, the mixture can be first formed as a pre-formed solid sheet of the coating 22 fabricated from the mixture, whereupon the solid sheet of the coating 22 can be subsequently laminated to the innermost surface 21 of the wall 12. Otherwise, the coating 22, 22' of the mixture can be applied as a low viscosity coating formulation or high viscosity coating formulation, such as via a spraying, rolling or dipping processes, by way of example and without limitation, directly on the desired area of the innermost and/or outermost surfaces 21, 21', 23, 23' of the sleeve 10, 10'. Of course, it should be recognized the coating 22, 22' can be applied to the entirety of the wall 12, 12', if desired. When relative movement between the sleeve 10, 10' and the elongate member 14 is to be prevented, the mixture of the coating 22, 22' is applied and bonded to at least a portion of the innermost surface 21, 21' that abuts directly against the elongate member 14, thereby providing the ability to bond the adhesive coating 22, 22' to an outer surface 25 of the elongate member 14 via activation by the clamping tool 24.

Upon applying, bonding, and drying the coating 22 to the desired areas of the wall 12, the wall 12 can be subsequently heat-set into a self-wrapping wall and/or wrapped about the elongate member 14. Otherwise, it should be recognized that the wall 12 can first be heat-set into a self-wrapping wall and then the wall 12 can be sprayed, dipped or otherwise coated with mixture of coating 22 in the desired areas.

It should be recognized that upon the coating 22, 22' being applied to the wall 12, 12', the coating 22, 22' attains its first, non-adhesive state upon being dried, and then, when desired, including after storing in inventory and/or shipping to the desired location where the sleeve 10, 10' is to be disposed about the elongate member 14, the coating 22, 22' can be selectively activated to form a bond with the desire surface via the clamping tool 24.

It should be recognized the coating 22 can be applied along one or both of the edges 16, 17, such that upon wrapping the wall 12 about the elongate member 14, the coating 22 can be bonded to the outer surface 25 of the elongate member 14 and/or to the outer surface 23 of the wall 12 to fix the opposite edges 16, 17 in overlapping relation with one another. It should also be recognized the coating 22, 22' can be applied to virtually any region of the wall 12, 12', whether in part or entirely about the wall 12, 12', to enable the coated portion or entirety of the wall 12, 12' to be bonded to another surface via the clamping tool 24.

Figure 4:
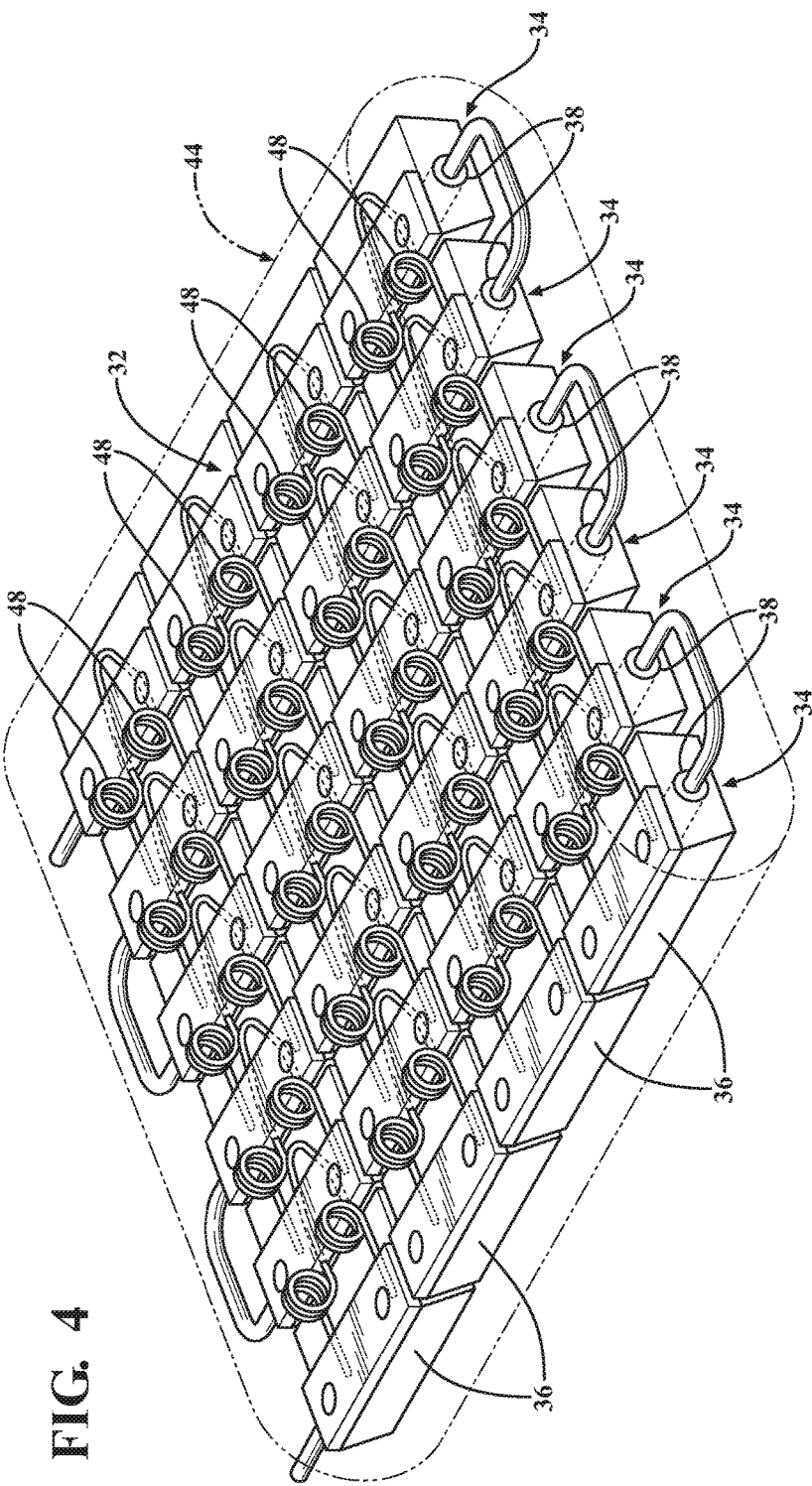
FIG. 4 is a broken away view of a clamping surface of the clamping tool of FIG. 2A showing internal heating members and a tension system therefor.
Figure 5:
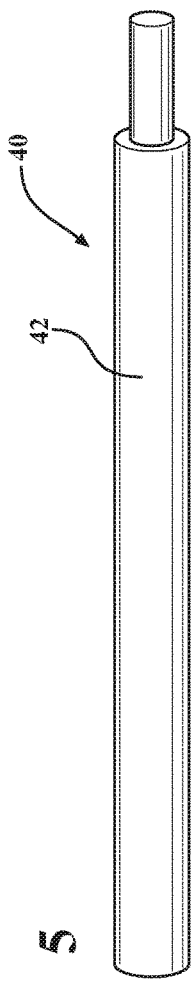
FIG. 5 is a perspective view of a heating element of the clamping surface.

As shown in FIGS. 2A-2D, the clamping tool 24 has a clamp assembly 26 including opposed clamp members 28, 30, with each of the clamp members 28, 30 having automatically, self-adjustable clamp surfaces 32. Each of the clamp surfaces 32 have a plurality of heating members 34. The heating members 34 are arranged in separate rows adjacent one another, with each row extending lengthwise across the width of the clamp members 28, 30. Each row is shown as including a plurality of aligned, independent heating members 34. As best shown in FIG. 4, the heating members 34 are shown as having conductive housings, also referred to as conductive members 36, with central cores 38 including heating elements 40 (FIG. 5) disposed therethrough. The heating elements 40 can be provided of any suitable heating wire or member, and in one exemplary embodiment, are provided as nichrome wire, by way of example and without limitation. The heating elements 40 are configured in operable electrical communication with any suitable source of energy, such as a 3.5V, 6.1A source of power via an electrical phase control method.

The heating elements 40 are encased or sheathed in outer ceramic sleeves 42, shown as being generally cylindrical, which are in turn shown as being disposed in through bores of the conductive members 36. In one exemplary embodiment, the conductive members 36 include copper segments coated with nickel plating, by way of example and without limitation.

The plurality of heating members 34 are enshrouded or covered in a flexible, conductive metal layer 44. In one presently preferred embodiment, the conductive metal layer 44 is provided as a steel foil, though other conductive metal foils are contemplated herein. The foil layer 44 is provided of a suitable thickness to remain tough, yet flexible, such as between about 0.02-0.06 mm, by way of example and without limitation, thereby allowing the layer 44 to flex with the underlying individual movement of the plurality of heating members 34.

The individual heating members 34 are selectively and adjustably tensioned to provide the desired degree of compliance to best conform to the contour of the sleeve 10, 10' being clamped and heated. To facilitate accommodating different types of sleeves, including wall hoop strength and diameters, the tensioning of the heating elements 34 can be made adjustable via an adjustable tension member 46. The adjustable tension member 46 within each clamp member 28, 30 includes a continuous torsion spring 48 operably interconnected to the individual heating members 34, and an adjustment device 50, such as a threaded member that can be selectively lengthened or shortened, by way of example and without limitation, to increase or decrease the tension within the torsion springs 48 to selectively adjust the degree of compliance of the individual heating members 34.

Figure 2A:
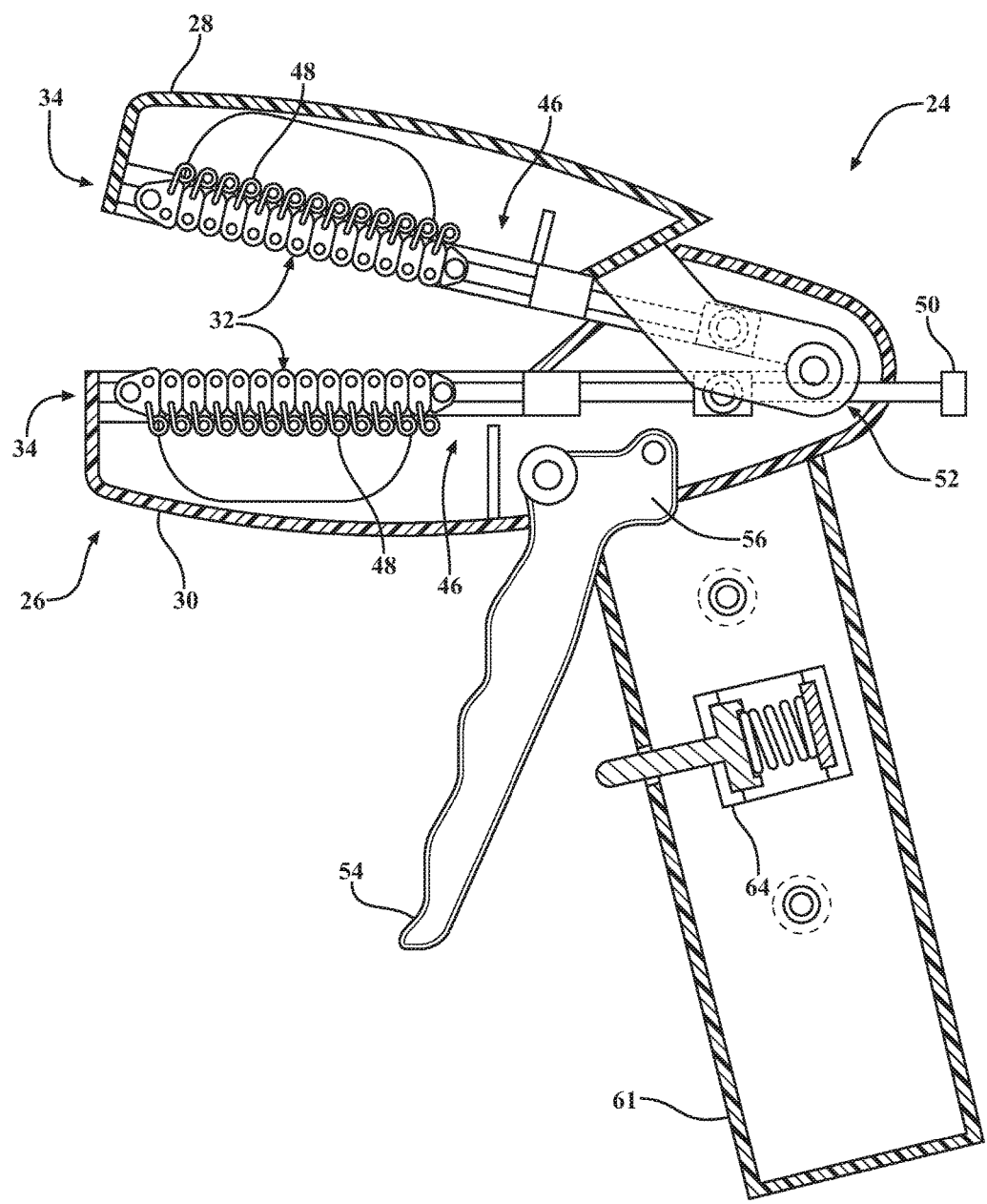
FIG. 2A is side view of a clamping tool constructed in accordance with one aspect of the invention for fixing the protective textile sleeve about the elongate member to be protected, shown in an open, non-clamped position.
Figure 2B:
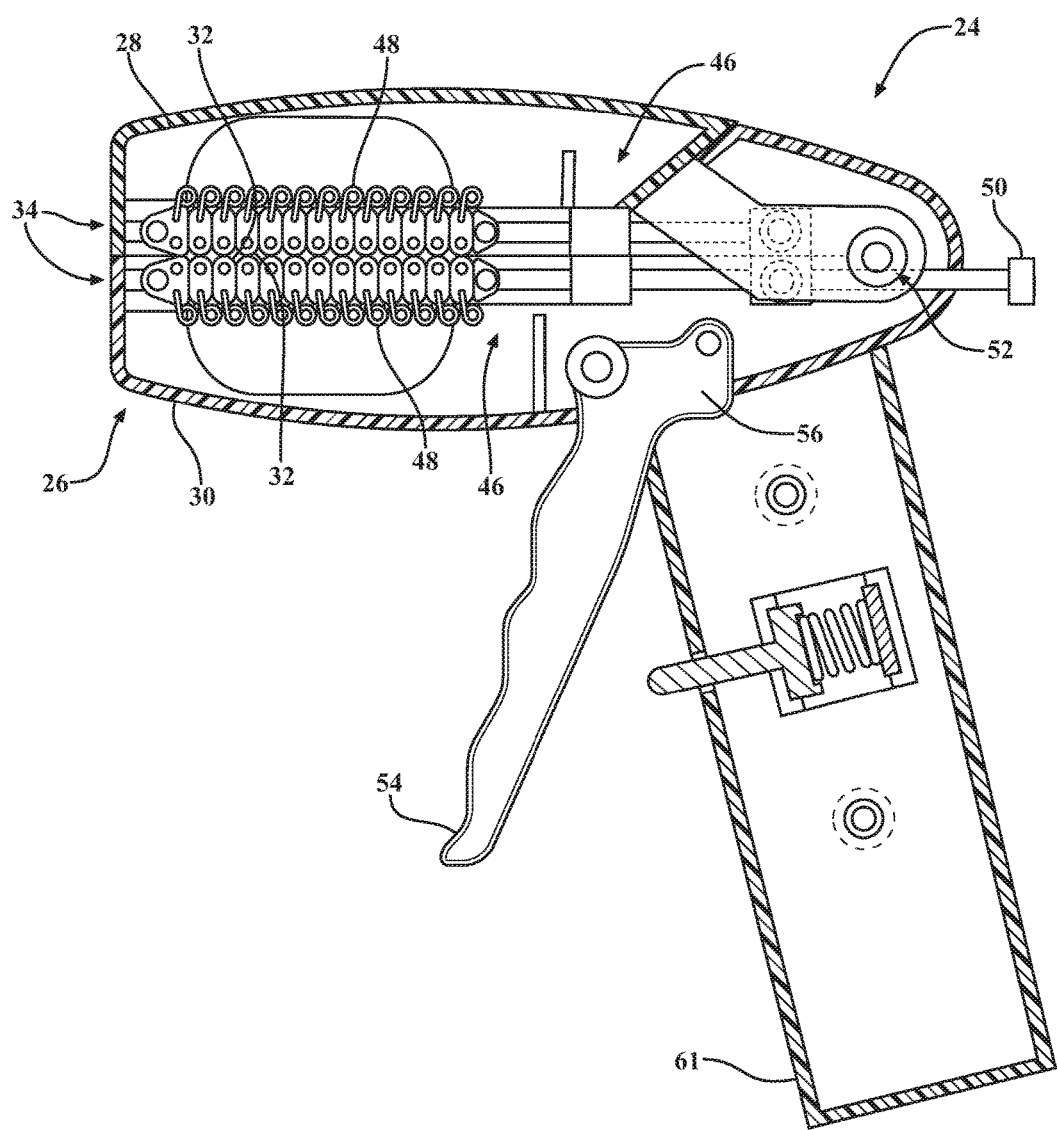
FIG. 2B is a view similar to FIG. 2A with the clamping tool shown in a closed position.
Figure 2C:
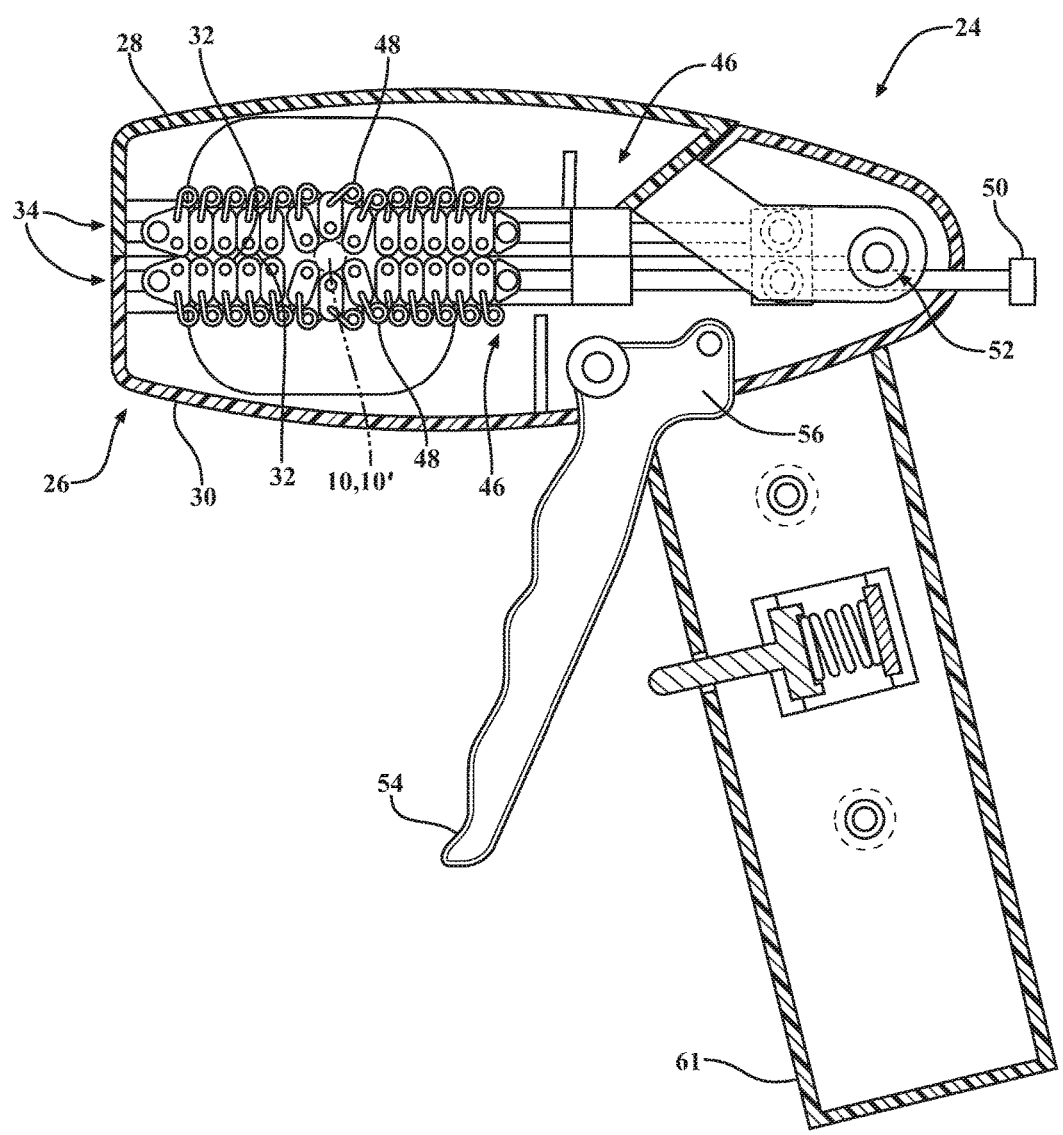
FIG. 2C is a view similar to FIG. 2A with the clamping tool shown in a closed, clamped position about a sleeve having a first diameter.
Figure 2D:
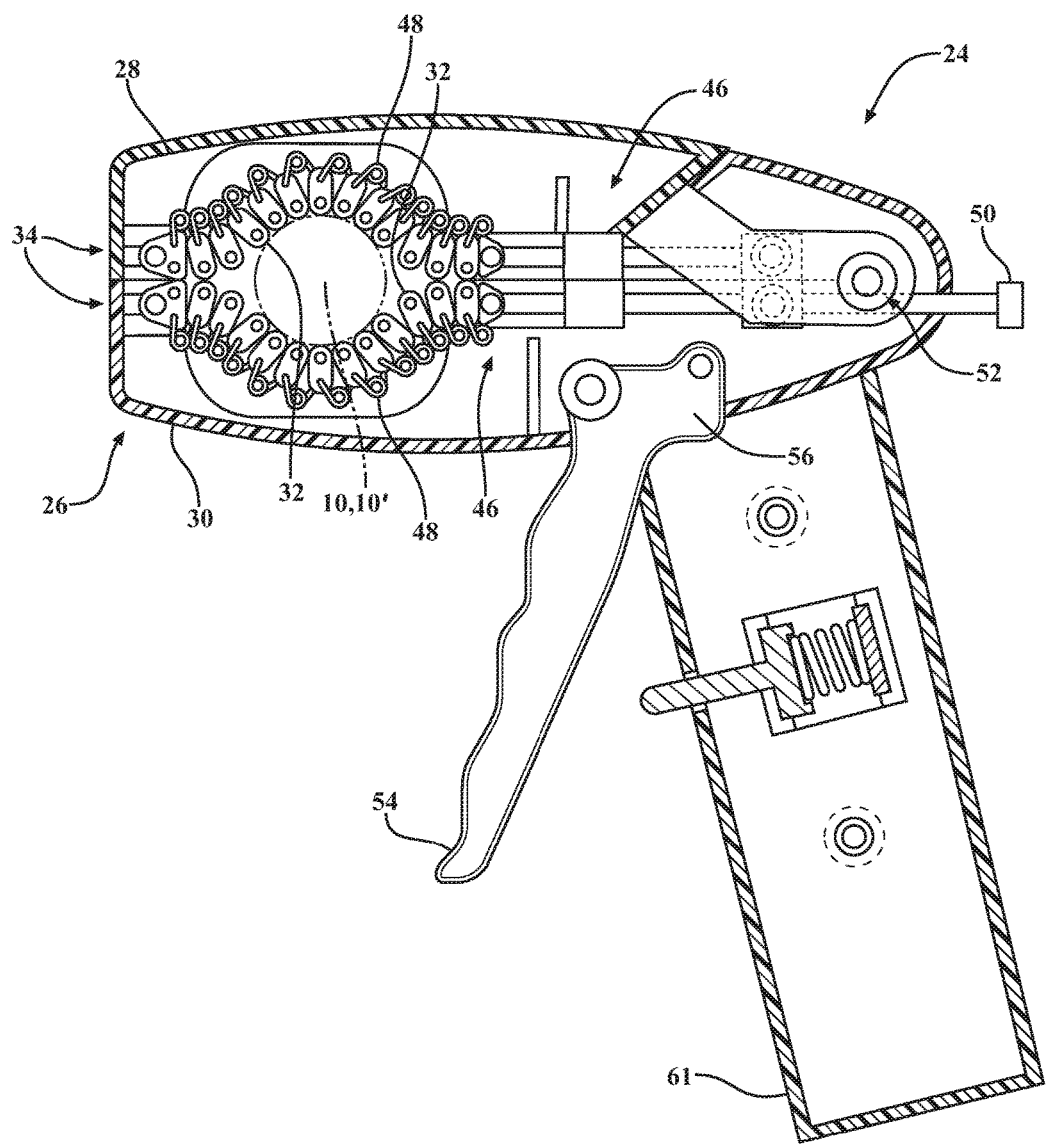
FIG. 2D is a view similar to FIG. 2C with the clamping tool shown in a closed, clamped position about a sleeve having a second diameter larger than the first diameter.
Figure 6A:
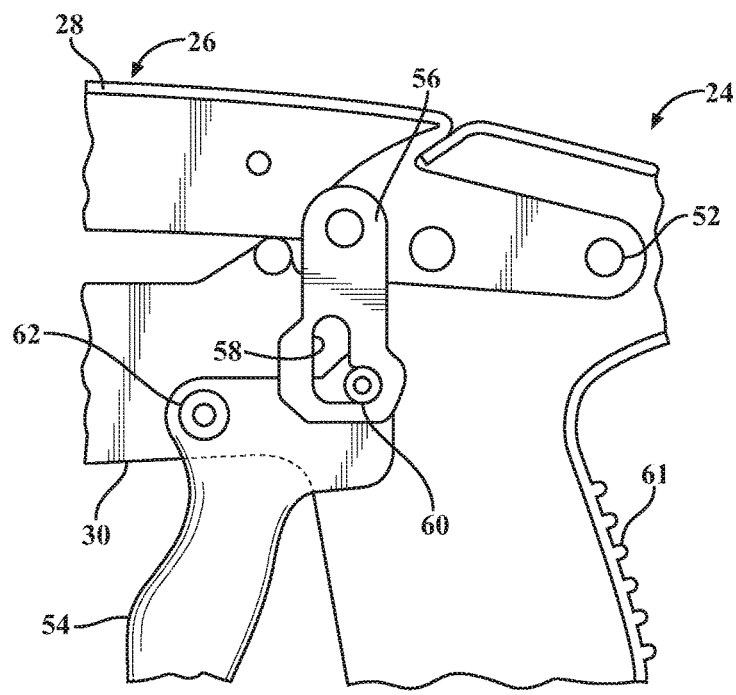
FIGS. 6A and 6B illustrated partial views of the clamping tool shown in respective closed and opened positions.
Figure 6B:
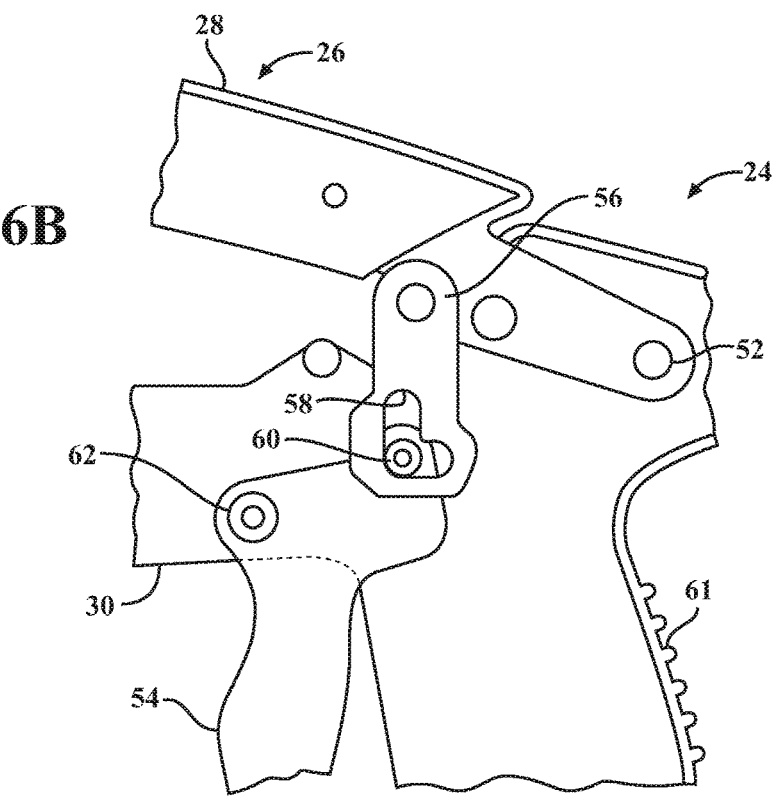

The clamp members 28, 30 are pivotally connected to one another at a pivot axis 52, and are actuatable to move relative to one another between an open position (FIG. 2A) and a closed position (FIGS. 2B-2D). While in the open position, the sleeve 10, 10' can be readily inserted and removed from between the clamping members 28, 30, and while in the closed position, the clamping members 28, 30 are brought into clamping contact with the outer surface 23, 23' of the respective sleeve 10, 10' (FIG. 2C showing relatively small diameter sleeve 10, 10' and FIG. 2D showing relatively large diameter sleeve 10, 10'). To actuate the clamping tool 24 to move between the open and closed positions, a lever 54 is pivotally and operably connected to at least one of the clamp members 28, 30 via a link mechanism 56. As best shown in FIGS. 6A-6B, the link mechanism 56 is shown as having a generally L-shaped slot or notch 58 for sliding receipt of a pin 60 therein. As the lever 54 is actuated, such as via manual hand operation or automated operation, the lever 54 is pivoted about a pivot axis 62, thereby causing the pin 60 to traverse the notch 58, and thus, causing the clamp members 28, 30 to move relative to one another. In accordance with one embodiment, while the lever 54 is in its fully released position, the clamp members 28, 30 can be biased, such as via a spring 64, into their closed position. Then, upon pivoting the lever 54 toward the handle 61, the spring bias can be overcome, causing the clamp members 28, 30 to be opened away from one another, such as when the lever 54 is between about 50-80 percent compressed toward the handle 61. When the clamp members 28, 30 are in their open position, the sleeve 10, 10', with the elongate member 14 disposed therein, can be placed between the clamp members 28, 30, and then the lever 54 can be fully compressed toward a handle 61 to allow the clamp members 28, 30 to return under the spring bias to their closed position, whereupon a uniform, repeatable clamping force is applied about the sleeve 10, 10' via the independently moveable heating members 34.

Upon the sleeve 10, 10, being clamped and heated, the adhesive coating 22 becomes activated and at least partially melted, thereby causing the adhesive 22 to bond with the adjacent abutting surface, whether another portion of the sleeve wall 12, and/or the outermost surface 23 of the elongate member 14. The entire coating activation process can take as few as about 2-4 seconds, by way of example and without limitation. The time or duty cycle is pre-settable, and can be monitored and regulated automatically via Bz and LED lighting. As such, the process is quick and economical. It should be recognized the clamping tool 24 can be set-up to be manually held by hand and activated by hand, or it can be fixed in place, such as in an assembly line, and automated for actuation via automated electronic control. The clamping tool 24 can be used in a wide variety of sleeve diameters, such as from as small as about 3 mm in diameter and larger.

Figure 11A:
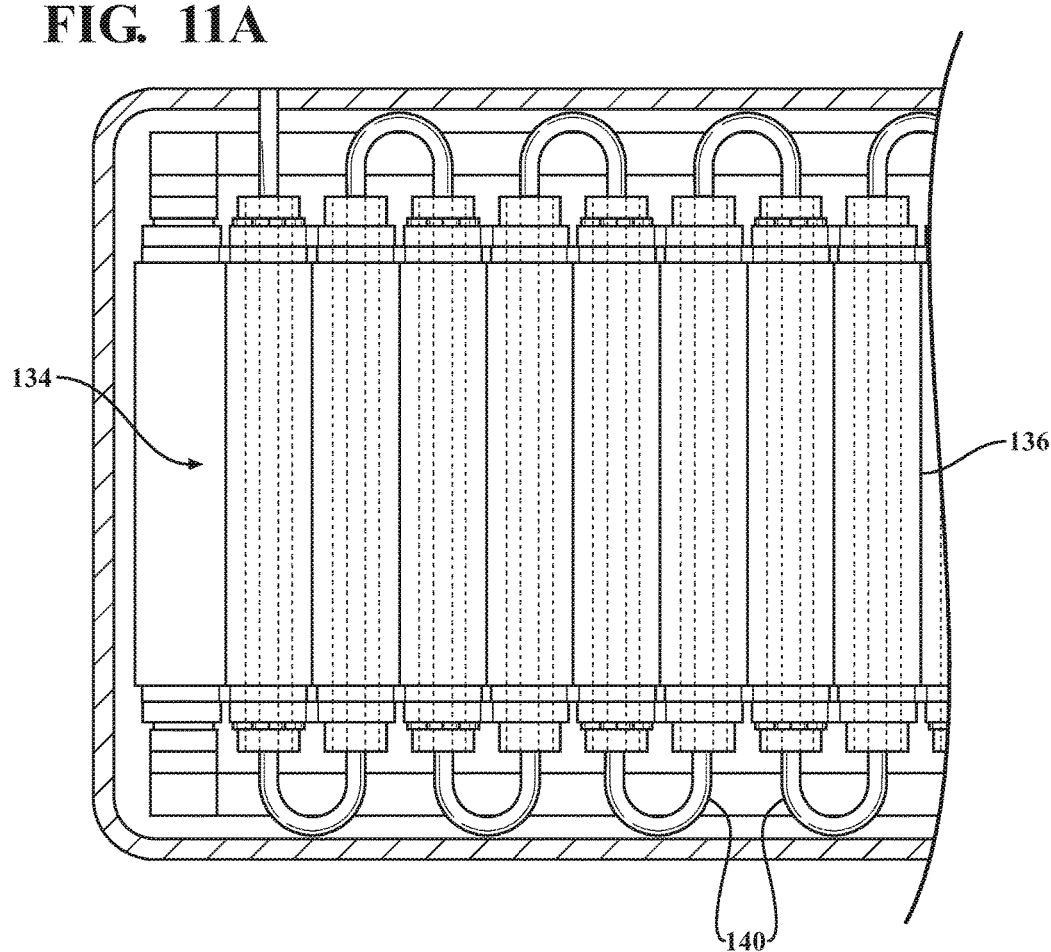
FIG. 11A is an enlarged, partial top view illustrating internal heating elements of a clamp member of the clamping tools of FIGS. 7A-7D and 10A-10D.
Figure 11B:
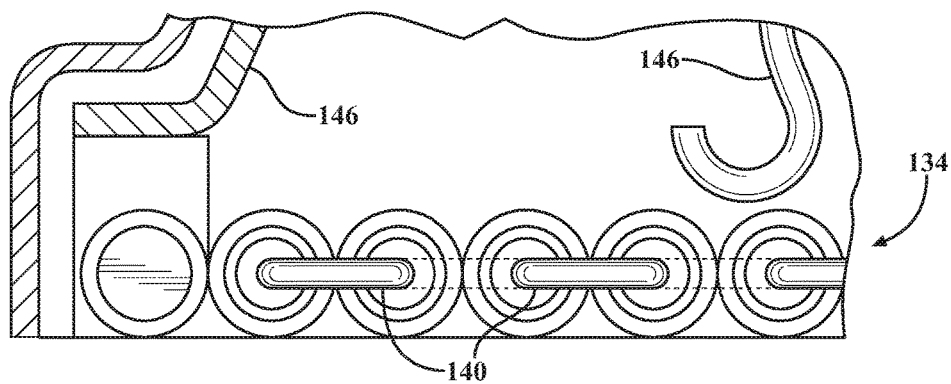
FIG. 11B is a side view of FIG. 11A.
Figure 11C:
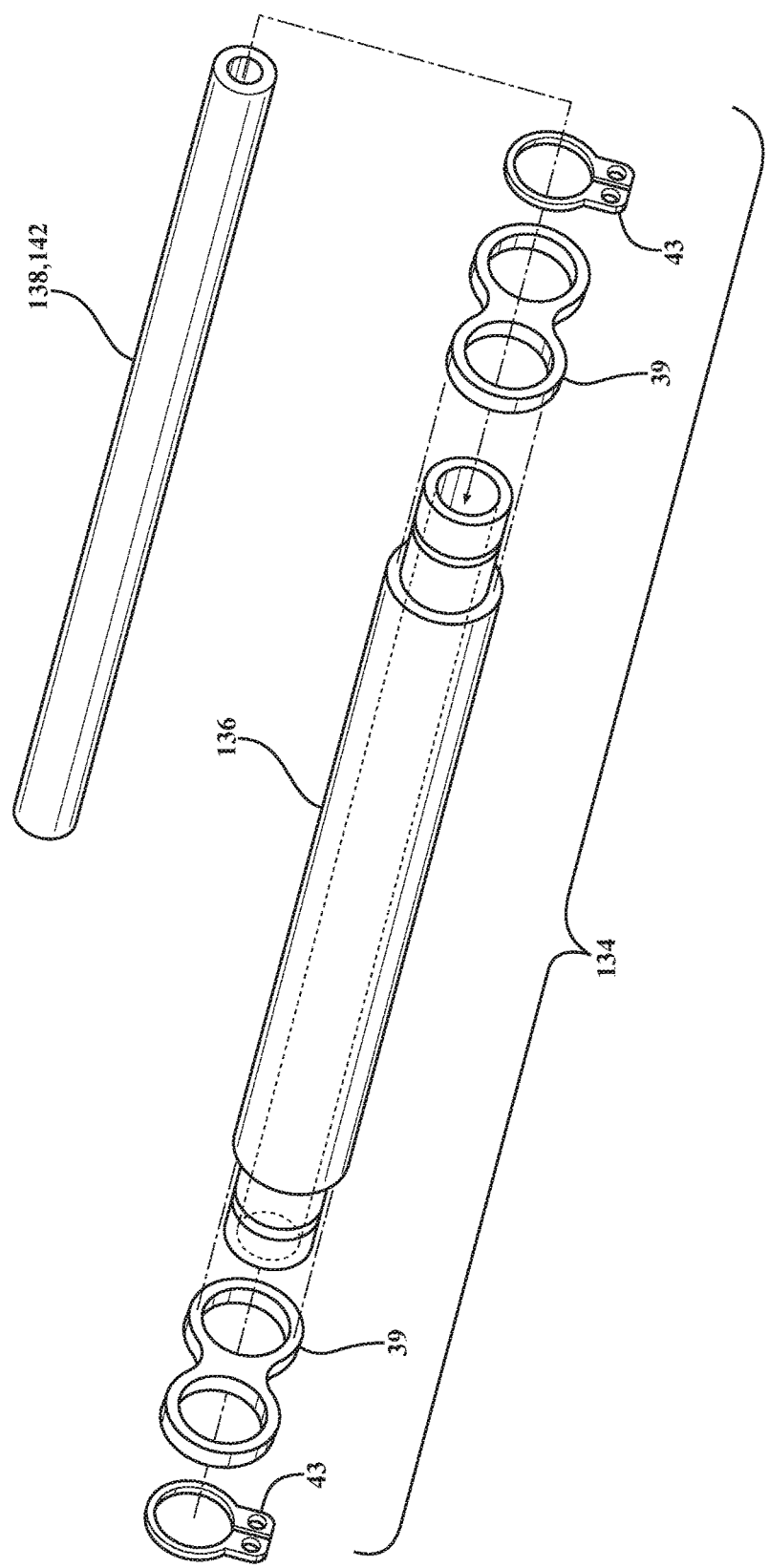
FIG. 11C is an exploded view of a heating element of a clamp member of the clamping tools of FIGS. 7A-7D and 10A-10D.

In FIGS. 7A-7D, a clamping tool 124 constructed in accordance with another aspect of the invention is shown, wherein the same reference numerals as used above, offset by a factor of 100, are used to identify like features. The clamping tool 124 has a clamp assembly 126 including opposed clamp members 128, 130, with each of the clamp members 128, 130 having automatically, self-adjustable clamp surfaces 132 (identified in FIG. 7A). The clamp members 128, 130 have a plurality of sections spaced from one another along the length of the clamping surfaces, wherein the plurality of sections, shown as two, by way of example and without limitation, are configured to accommodate different textile sleeves having different diameters from one another. Each of the clamp surfaces 132 have a plurality of elongate heating members 134 arranged in separate opposed rows adjacent one another, as discussed above. As best shown in FIGS. 11A-11C, the heating members 134 are shown as having conductive housings, also referred to as conductive members 136, with central cores 138 including heating elements 140 disposed therethrough. The heating elements 140 can be provided of any suitable heating wire or member, and in one exemplary embodiment, are provided as nichrome wire, by way of example and without limitation. The heating elements 140 are configured in operable electrical communication with any suitable source of energy, such as a 3.5V, 6.1A source of power via an electrical phase control method.

The heating elements 140 are encased or sheathed in outer ceramic sleeves 142 of the central cores 138, shown as being generally cylindrical, which are in turn shown as being disposed in through bores of the conductive members 136. In one exemplary embodiment, the conductive members 136 include elongate copper sleeves, by way of example and without limitation, wherein the conductive members 136 are shown as being linked to one another adjacent their opposite ends via link members 39 (FIG. 11C), with the link members 39 being retained via fasteners, such as c-clips 43, by way of example and without limitation, similar to a standard link-type chain. The link members 39 allow the individual heating elements 140 to pivot relative to one another, thereby allowing the heating members 134 to conform closely to an outer surface of the textile sleeve 10, 10' while being clamped, as discussed further below.

The individual heating members 134 are selectively and adjustably tensioned to provide the desired degree of compliance to best conform to the contour of the sleeve 10, 10' being clamped and heated via an adjustable tension member 146, which includes a continuous torsion spring and an adjustment device 150, such as a threaded member that can be selectively lengthened or shortened, by way of example and without limitation, to increase or decrease the tension within the torsion springs to selectively adjust the degree of compliance of the individual heating members 134.

Figure 7A:
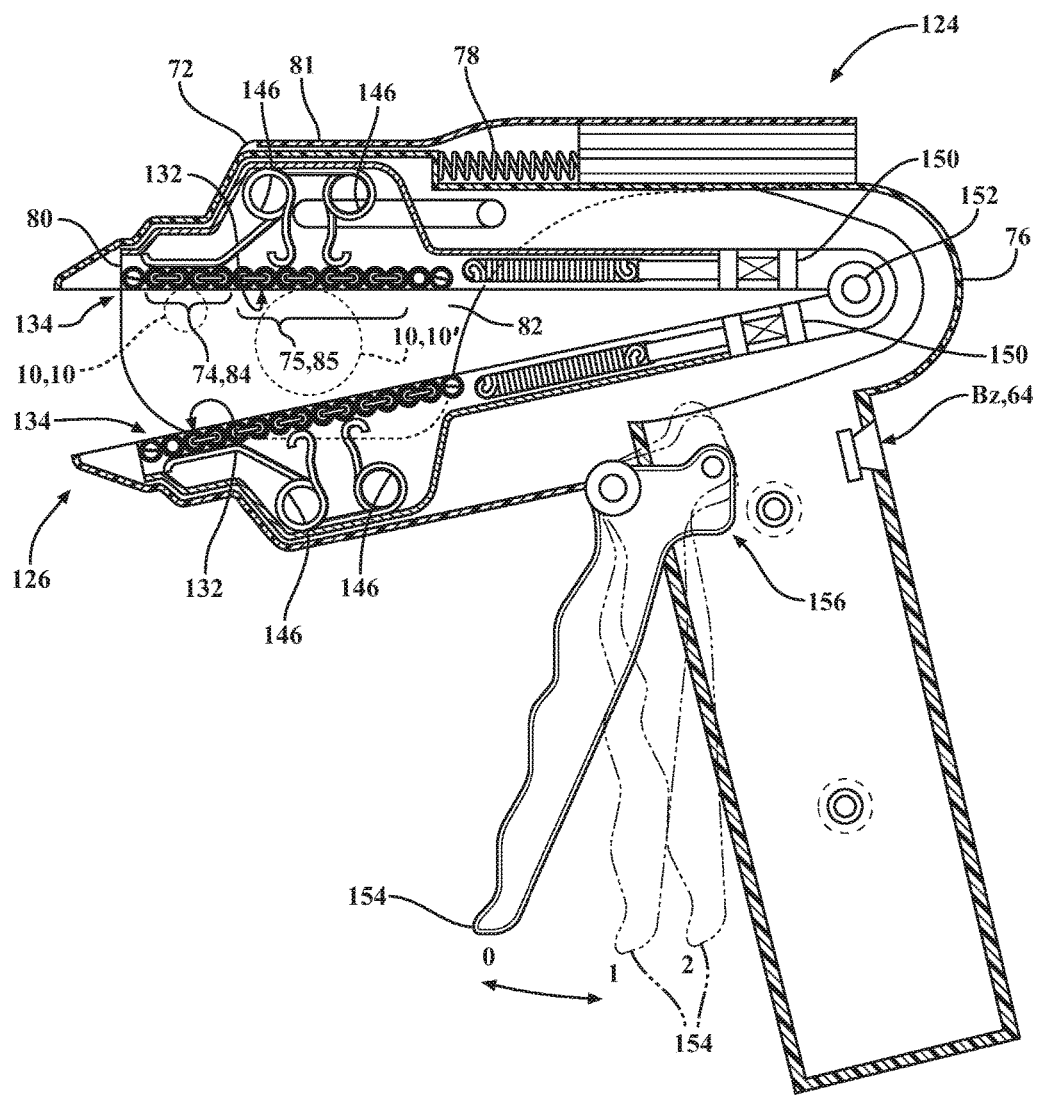
FIG. 7A is side view of a clamping tool constructed in accordance with another aspect of the invention for fixing the protective textile sleeve about the elongate member to be protected, shown in an open, ready for loading state.
Figure 7B:
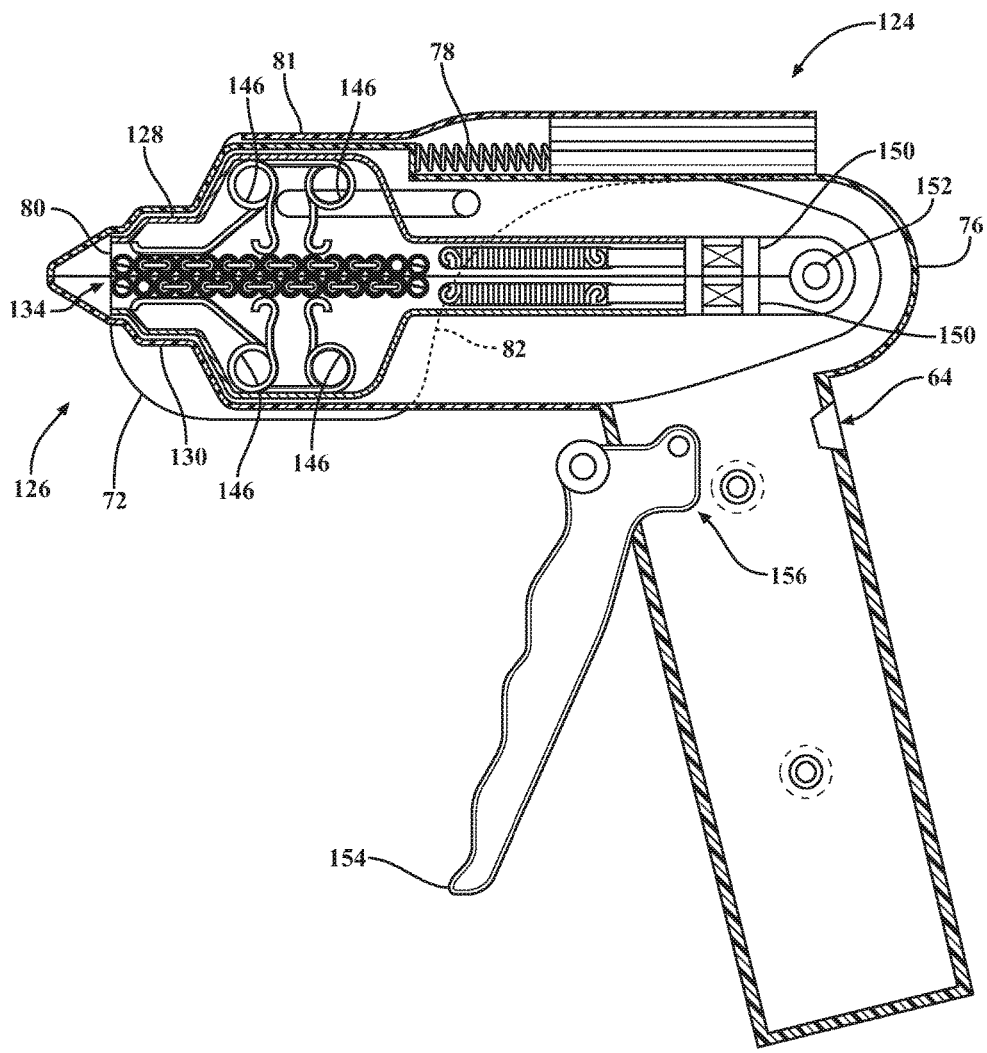
FIG. 7B is a view similar to FIG. 7A with the clamping tool shown in a closed, non-loaded state.
Figure 7D:
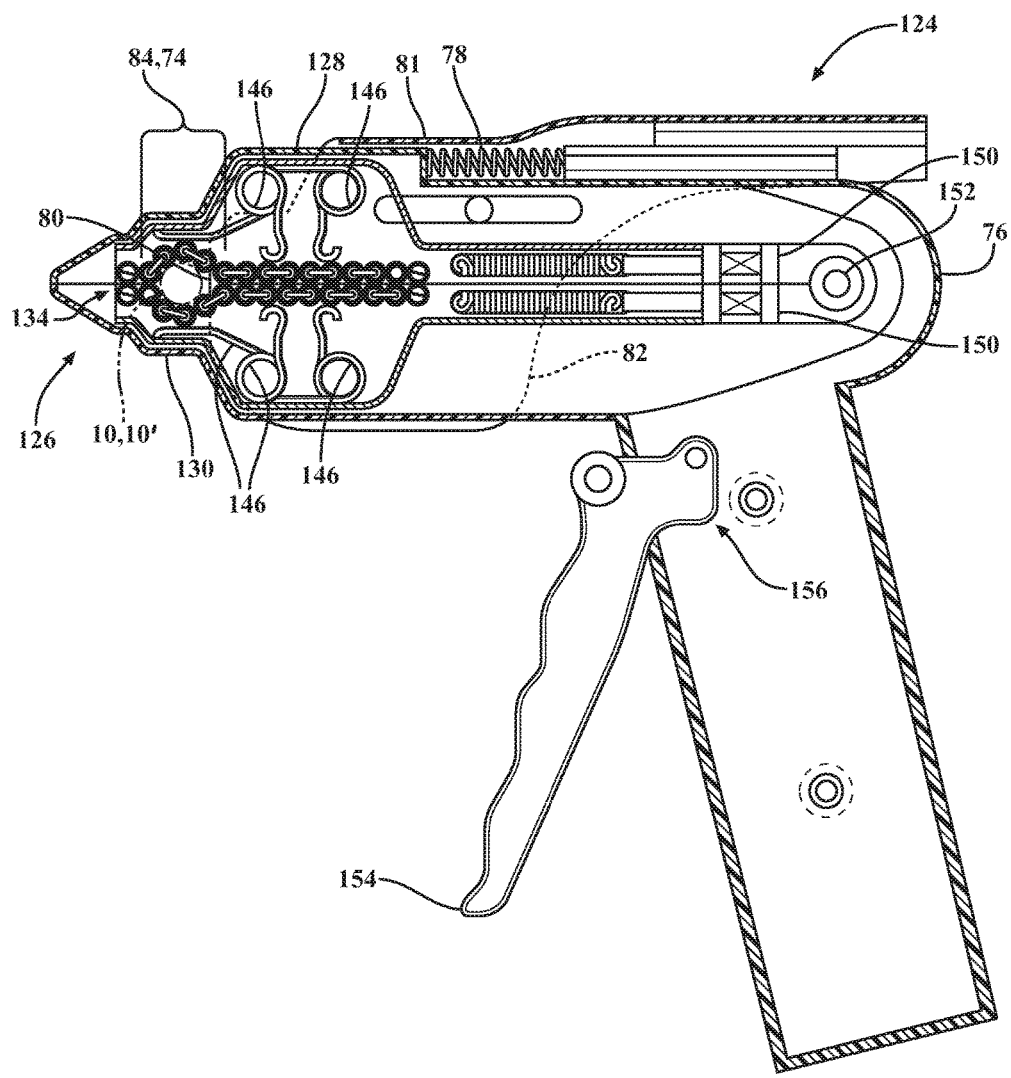
FIG. 7D is a view similar to FIG. 7C with the clamping tool shown in another closed, second loaded state.
Figure 9:
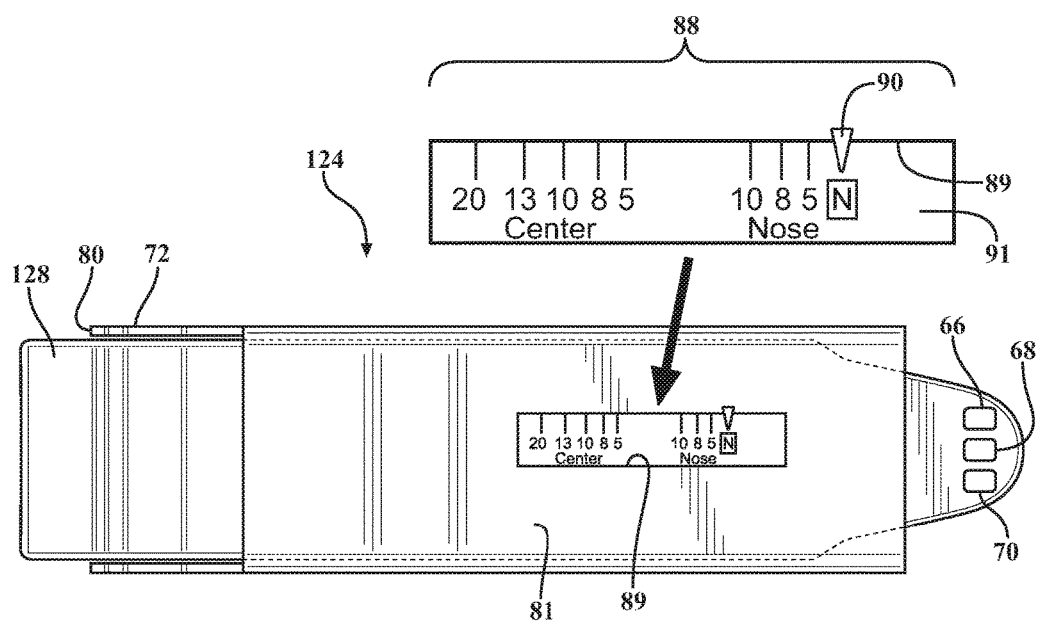
FIG. 9 is a top view of the clamping tool of FIGS. 7A-7D.
Figure 10A:
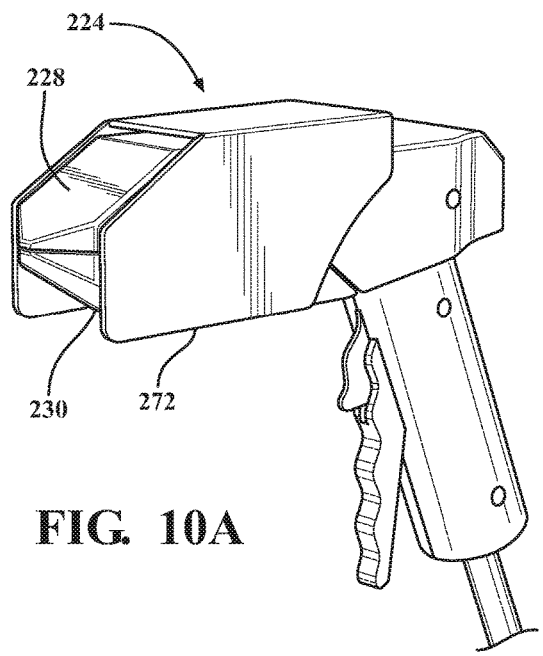
FIG. 10A is perspective view of a clamping tool constructed in accordance with another aspect of the invention for fixing the protective textile sleeve about the elongate member to be protected, shown in a closed, non-loaded state.
Figure 10B:
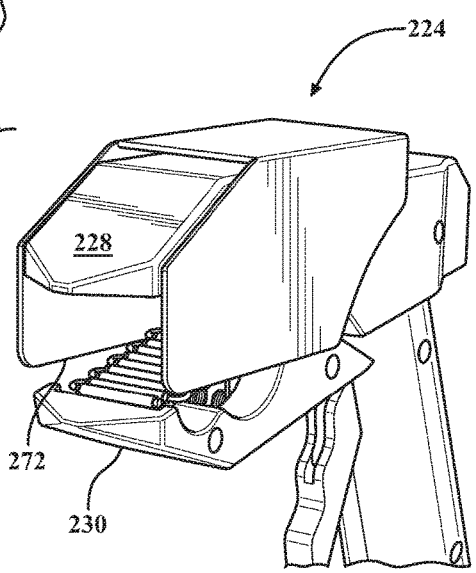
FIG. 10B is a view similar to FIG. 10A with the clamping tool shown in an open, ready for loading state.
Figure 10D:
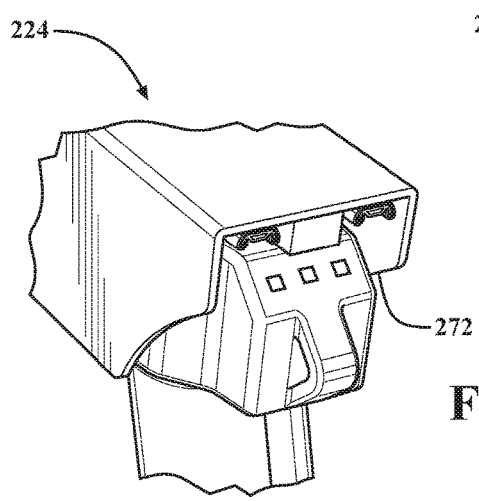
FIG. 10D is a partial rear perspective view of the clamping tool of FIG. 10A.
Figure 10C:
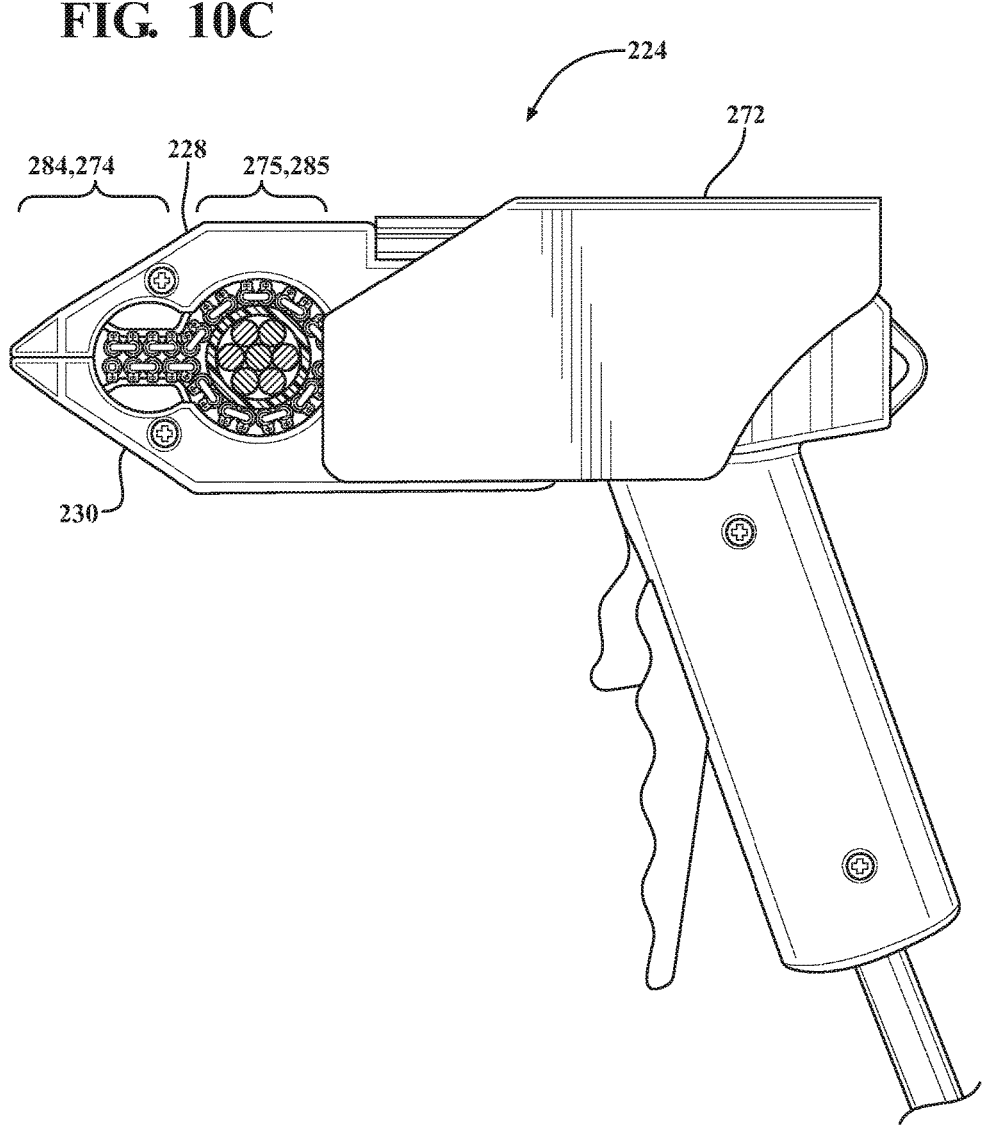
FIG. 10C is a view similar to FIG. 10B with the clamping tool shown in a closed, loaded, state.

The clamp members 128, 130 are pivotally connected to one another at a pivot axis 152, and are actuatable to move relative to one another between an open position (FIG. 7A) and a closed position (FIGS. 7B-7D). While in the open position, the sleeve 10, 10' can be readily inserted and removed from between the clamping members 128, 130, and while in the closed position, the clamping members 128, 130 are brought into clamping contact with the outer surface 23, 23' of the respective sleeve 10, 10' (FIG. 7D showing a relatively small diameter sleeve 10, 10' and FIG. 7C showing a relatively large diameter sleeve 10, 10'). To actuate the clamping tool 124 to move between the open and closed positions, a lever 154 is pivotally and operably connected to at least one of the clamp members 128, 130 via a link mechanism 156, similar to that discussed above with regard to FIGS. 6A-6B. As the lever 154 is actuated, such as via manual hand operation or automated operation, the lever 154 is pivoted about a pivot axis 162 from position 0 (positions identified in FIG. 7A), wherein the clamp members 128, 130 are open, to position 1, wherein the clamp members are closed (FIGS. 7B-7D). Then, upon the sleeve 10, 10' being clamped and heated, the adhesive coating 22 becomes activated to bond with the adjacent abutting surface, whether another portion of the sleeve wall 12, and/or the outermost surface 23 of the elongate member 14, as discussed above. The entire coating activation process can take as few as about 2-4 seconds, by way of example and without limitation. The time or duty cycle is pre-settable, and can be monitored and regulated automatically via an audible signal (buzzer 64 to indicated when the heating and bonding cycle is complete; FIGS. 7A-7B) and visual indicator, such as LED lighting (FIG. 9), including a power-on LED indicator 66, a clamp timer LED indicator 68 (blinking indicates heating and bonding cycle is complete), and an over-temperature LED indicator 70. As such, the process is made quick, easy and economical. Then, when the bonding is complete, such as between the 2-4 second interval, the lever 154 is pulled further to position 2, whereupon the clamp members 128, 130 return to an open position, and the process can be repeated by releasing the lever 154 and repeating the sequence in different region of the sleeve 10, 10' and elongate member 14, or with a new sleeve 10, 10' and elongate member 14. It should be recognized the clamping tool 124 can be set-up to be manually held by hand and activated by hand, or it can be fixed in place, such as in an assembly line, and automated for actuation via automated electronic control. The clamping tool 124 can be used in a wide variety of sleeve diameters, such as from as small as about 3 mm in diameter and larger, such as 20 mm or greater.

Figure 8:
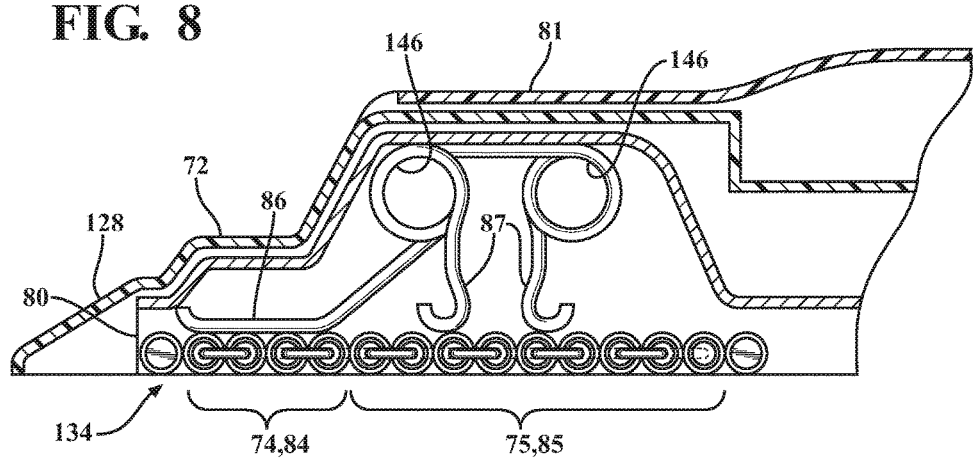
FIG. 8 is an enlarged, partial cross-sectional side view of a clamp member of the clamping tool of FIGS. 7A-7D.

The clamping tool 124 further includes a protective cover 72 configured to shield the heating members 134 from being accidentally touched by a user during use and to shield heat from radiating outwardly from the heating elements 140. The protective cover 72 is configured to slide along the length of the clamp members 128, 130 between a first completely shielded position (FIGS. 7A-7B) to an in-use position (FIGS. 7C-7D). While in the in-use position, the clamp members 128, 130 are brought into their closed and abutting clamped positions, and the protective cover 72 is slid away from a nose portion or region 74 (FIGS. 7A, 7B, 7D, 8) toward a rearwardly facing end, also referred to as proximal end 76 of the clamping tool 124, to expose the nose region 74 of the clamp members 128, 130, and possibly to expose a generally central main portion or region 75 (FIGS. 7A, 7C, 8) of the clamp members 128, 130, depending on the diameter of the sleeve 10, 10'. The protective cover 72 is biased via a spring member 78 toward the first completely shielded position; however, the bias of the spring member 78 is overcome by loading the sleeve 10, 10' into abutment with an end 80 of the protective cover 72, thereby causing the protective cover 72 to be pushed rearwardly toward the proximal end 76 as the sleeve 10, 10' is positioned between the clamp members 128, 130. With the sleeve 10, 10' properly positioned between the clamp members 128, 130, the clamp members 128, 130 are closed, as discussed above, via actuation of the lever 154. Then, upon removing the sleeve 10, 10' from the between the clamp members 128, 130, the spring member 78 automatically returns the protective cover 72 to the fully shielded position. It should be recognized the protective cover 72 is fabricated from a heat-resistant, thermally insulative material, and the shield region of the cover 72 is further configured having a generally inverted U-shape as viewed in lateral cross-section, thereby providing an open U-shaped channel, through which the clamp members 128, 130 pass in a clearance fit, bounded by an upper surface 81 and opposite sidewalls 82 of the protective cover 72.

To facilitate clamping relatively small diameter sleeves 10, 10', such as between about 3 mm-8 mm and also relative large diameter sleeves 10, 10', such as between about 8 mm-20 mm, by way of example and without limitation, under a substantially uniform clamping pressure about the circumference of the sleeve 10, 10', the clamp surfaces 132 can be provided having a plurality, shown as a pair, of separate sections, identified as a nose clamping section 84 and a main clamping section 85. The nose clamping section 84 is formed in the nose region 74, while the main clamping section 85 is provided in the main region 75. As shown, the nose clamping section 84 has a reduced diameter size capacity relative to the main clamping section 85, and further yet, a portion 86 (FIG. 8) of the torsion spring 148 biasing the heating elements 140 within the nose clamping section 84 imparts a lighter clamping relative to a portion 87 of the torsion spring 140 within the main clamping section 85, thereby allowing the heating elements 140 within the nose clamping section 84 to more easily conform about the entirety of substantial entirety of the reduced diameter sleeve 10, 10'. It should be recognized that the nose region 74 can also be used on necked down or reduced diameter ends regions or branches of a sleeve 10, 10', as desired, while the main region 75 can be reserved for use on the relatively larger diameter regions of the sleeve 10, 10', such as those regions extending about electrically connectors or the like. To facilitate locating the sleeve 10, 10' within the desired region 74, 75, a position scale 88 (FIG. 9) indicating the precise location of the regions 74, 75 between the clamp members 128, 130 can be provided on an upper surface 91 of the clamping tool 124, while the upper surface 81 of the protective cover 72 can have a window 89 surrounding the position scale 88, wherein an identifying mark 90 on the upper surface 81 of the cover 72 aligns with an associated identifier on the position scale 88. As such, as the protective cover 72 slides along the upper surface of the clamping tool 124, the identifying mark 90 is caused to align with a location indicator on the position scale 88, thereby indicating the precise position of the sleeve 10, 10' within the regions 74, 75 between the clamp members 128, 130. Accordingly, the user can readily discern the location of the sleeve 10, 10' between the clamp members 128, 130 without having to look between the clamp members 128, 130. This is helpful in locating the sleeve 10, 10' within the desired section 84, 85 prior to clamping the sleeve 10, 10' given the protective cover 72 is partially obstructing the direct viewing between the clamping members 128, 130.

In FIGS. 10A-10D, a clamping tool 224 constructed in accordance with another aspect of the invention is shown, wherein the same reference numerals as used above, offset by a factor of 200, are used to identify like features. The clamping tool 224 is similar to that described above for the clamping tool 124, including clamping members 228, 230 having a nose region 274 and main region 275 with respective nose clamping section 284 and main clamping section 285, and further including a protective cover 272 selectively slidable along the clamping members 228, 230 under the bias of a spring member 278, as discussed above. A notable difference between the clamping tools 124, 224 is with regard to the configurations of the respective nose regions 74, 274 and main regions 75, 275 and associated nose clamping sections 84, 284 and main clamping sections 85, 285. The nose region 274 and main region 275 and associated nose clamping section 284 and main clamping section 285 of the clamping tool 224 have contoured shaped conforming to that of the largest diameter of sleeve 10, 10' intended to be clamped therein. As such, the nose region 274 of the clamp members 228, 230 each have a radiused contour between about 6-12 mm, by way of example and without limitation, while the main region 275 of the clamp members 228, 230 each have a radiused contour between about 10-22 mm, by way of example and without limitation. It should be recognized the radius of the contoured surface of each can be provided as desired.

Many modifications and variations of the present invention are possible in light of the above teachings. It is, therefore, to be understood that the invention may be practiced otherwise than as specifically described, and that the scope of the invention is defined by the claims. It is contemplated that all features of all claims and of all embodiments can be combined with each other, so long as such combinations would not contradict one another.

What is claimed is:

1. A tool for fixing a textile sleeve about an elongate member disposed therein, comprising:
a clamp assembly having opposed clamp members pivotal about a pivot axis between open and closed states, each of said clamp members having a planar clamp surface extending lengthwise along a first axis away from said pivot axis to a free end of said clamp members, said planar clamp surfaces being configured for clamping abutment with the textile sleeve disposed lengthwise along a second axis, transverse to said first axis, across a width of each of said clamp surfaces, each of said planar clamp surfaces include a plurality of heating members operably connected to a source of power to be selectively heated, said heating members being supported for independent movement relative to one another to allow said planar clamp surfaces to become non-planar clamp surfaces by automatically conforming to an outer peripheral shape of a portion of the textile sleeve disposed between said clamp members.

2. The tool of claim 1 wherein said heating members are arranged in adjacent rows extending lengthwise along said second axis across said widths of said clamp surfaces.

3. The tool of claim 2 wherein each row includes a plurality of said plurality of heating members spaced from one another along said second axis.

4. The tool of claim 1 further including a plurality of spring members, each of said spring members being configured in operable engagement with a plurality of said heating members to impart a spring bias on said heating members for said independent movement.

5. The tool of claim 4 wherein each of said spring members is configured to impart a variable spring bias along said first axis.

6. The tool of claim 4 further including an adjustable tension member operably connected to said spring members, said adjustable tension member being selectively adjustable to change said spring bias imparted on said heating members.

7. The tool of claim 4 wherein said adjustable tension member includes a torsion spring.

8. The tool of claim 1 wherein the clamp members are configured having first and second sections extending lengthwise along said second axis adjacent one another in spaced relation from one another along said first axis, said first section being configured to accommodate a first diameter of the textile sleeve and said second section being configured to accommodate a second diameter of the textile sleeve, said second diameter being larger than said first diameter.

9. The tool of claim 8 wherein the clamp members have a nose portion adjacent said free end of said clamp members and a main portion adjacent said nose portion, wherein said first section is in said nose portion and said second section is in said main portion.

10. The tool of claim 1 further including a protective cover slidable along said first axis from a protective position substantially shielding said heating members during a non-clamping state and a position exposing said heating members during a clamping state.

11. The tool of claim 10 wherein said protective cover is spring biased to toward said protective position and is slidable against the spring bias along said first axis in direct response to disposing the textile sleeve between the clamp members.

12. A tool for fixing a textile sleeve about an elongate member disposed therein, comprising:
a clamp assembly having opposed clamp members pivotal about an axis between open and closed states, each of said clamp members having a clamp surface with a length of said clamp surfaces extending along a first axis away from said pivot axis toward a free end of said clamp members, said clamp surfaces being configured for clamping abutment with the textile sleeve disposed lengthwise along a second axis, transverse to said first axis, across a width of each of said clamp surfaces, each of said clamp surfaces include a plurality of heating members operably connected to a source of power to be selectively heated, said heating members being supported for independent movement relative to one another to allow said heating members within each of said clamp members to automatically transition from being in planar relation with one another along the length of said clamp surfaces while in the open state to conform to an outer peripheral shape of a portion of the textile sleeve disposed between said clamp members while said clamp members are in the closed state.

13. The tool of claim 12 wherein said heating members are arranged in adjacent rows extending lengthwise along said second axis across said widths of said clamp surfaces.

14. The tool of claim 13 wherein each row includes a plurality of said plurality of heating members spaced from one another along said second axis.

15. The tool of claim 12 further including a plurality of spring members, each of said spring members being configured in operable engagement with a plurality of said heating members to impart a spring bias on said heating members for said independent movement.

16. The tool of claim 15 wherein each of said spring members is configured to impart a variable spring bias along said first axis.

\* \* \* \* \*